United States Patent
Sharma et al.

(10) Patent No.: US 11,687,409 B1
(45) Date of Patent: Jun. 27, 2023

(54) DATA STORAGE DEVICE AND METHOD FOR DATA PROTECTION USING XOR PARITY

(71) Applicant: Western Digital Technologies, Inc., San Jose, CA (US)

(72) Inventors: Varun Sharma, Vaishali Ghaziabad (IN); Vishal Sharma, Bangalore (IN); Arun Thandapani, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/563,533

(22) Filed: Dec. 28, 2021

(51) Int. Cl.
| | |
|---|---|
| G06F 11/00 | (2006.01) |
| G06F 11/10 | (2006.01) |
| G06F 11/14 | (2006.01) |
| G06F 3/06 | (2006.01) |
| G06F 11/07 | (2006.01) |

(52) U.S. Cl.
CPC ........ G06F 11/1068 (2013.01); G06F 3/0619 (2013.01); G06F 3/0659 (2013.01); G06F 3/0679 (2013.01); G06F 11/0772 (2013.01); G06F 11/1435 (2013.01)

(58) Field of Classification Search
None
See application file for complete search history.

(56) References Cited

U.S. PATENT DOCUMENTS

| | | |
|---|---|---|
| 8,832,528 B2 | 9/2014 | Thatcher et al. |
| 9,354,973 B2 | 5/2016 | Wakchaure et al. |
| 9,673,840 B2 | 6/2017 | Kumar |
| 9,830,093 B2 | 11/2017 | Guo et al. |
| 9,996,285 B2 | 6/2018 | Kang et al. |
| 10,339,000 B2 | 7/2019 | Yang et al. |
| 11,042,432 B1 | 6/2021 | Rao et al. |
| 2007/0150790 A1* | 6/2007 | Gross .................. G06F 11/1044 714/763 |
| 2016/0266965 A1* | 9/2016 | B ........................... G06F 11/108 |
| 2017/0123682 A1* | 5/2017 | Sinclair .................. G06F 12/02 |
| 2018/0287632 A1* | 10/2018 | Rom ..................... G06F 3/0688 |
| 2018/0287634 A1* | 10/2018 | Rom ................. H03M 13/3715 |
| 2019/0354478 A1* | 11/2019 | Kashyap ............. G06F 11/1072 |
| 2020/0218605 A1* | 7/2020 | Subramanian ........ G06F 11/108 |

(Continued)

OTHER PUBLICATIONS

L. Zhu et al., "Fault Tolerant Algorithm for NVM to Reuse the Error Blocks," 2016 13th International Conference on Embedded Software and Systems (ICESS), Chengdu, China, 2016, pp. 54-59, doi: 10.1109/ICESS.2016.40. (Year: 2016).*

*Primary Examiner* — Daniel F. McMahon
(74) *Attorney, Agent, or Firm* — Michael Best & Friedrich LLP

(57) ABSTRACT

A data storage device includes a non-volatile memory and a data storage controller. The data storage controller is configured to generate first XOR parities based on first data of a first metablock of the non-volatile memory and store the first XOR parities in a second metablock of the non-volatile memory. The data storage controller is also configured to generate second XOR parities corresponding to second data of the second metablock. The second data includes two or more XOR parities of the first XOR parities. The data storage controller is further configured to store the second parities in a reserved portion of the first metablock.

20 Claims, 4 Drawing Sheets

(56) References Cited

U.S. PATENT DOCUMENTS

| | | | |
|---|---|---|---|
| 2021/0279127 A1* | 9/2021 | Jang | G06F 11/1004 |
| 2022/0027233 A1* | 1/2022 | Klein | G06F 3/0688 |
| 2022/0075559 A1* | 3/2022 | Balakrishnan | G06F 3/0679 |
| 2022/0083221 A1* | 3/2022 | Agarwal | G06F 12/0246 |

* cited by examiner

XOR Parity Metablock

| Metapage | Fim0 Die 0 | | | | Fim1 Die 0 | | | | Fim2 Die 0 | | | 310 |
|---|---|---|---|---|---|---|---|---|---|---|---|---|
| | PL0 | PL1 | PL2 | PL3 | PL0 | PL1 | PL2 | PL3 | PL0 | PL1 | PL2 | PL3 |
| 0 | Bin0 | Bin1 | Bin2 | Bin3 | Bin4 | Bin5 | Bin6 | Bin7 | Bin8 | Bin9 | Bin10 | Bin11 |
| 1 | Bin12 | Bin13 | Bin14 | Bin15 | Bin16 | Bin17 | Bin18 | Bin19 | Bin20 | Bin21 | Bin22 | Bin23 |
| 2 | Bin24 | Bin25 | Bin26 | Bin27 | Bin28 | Bin29 | Bin30 | Bin31 | Bin32 | Bin33 | Bin34 | Bin35 |
| 3 | Bin36 | Bin37 | Bin38 | Bin39 | Bin40 | Bin41 | Bin42 | Bin43 | Bin44 | Bin45 | Bin46 | Bin47 |
| 4 | Bin48 | Bin49 | Bin50 | Bin51 | Bin52 | Bin53 | Bin54 | Bin55 | Bin56 | Bin57 | Bin58 | Bin59 |
| 5 | Bin60 | Bin61 | Bin62 | Bin63 | Bin64 | Bin65 | Bin66 | Bin67 | Bin68 | Bin69 | Bin70 | Bin71 |
| 6 | Bin72 | Bin73 | Bin74 | Bin75 | Bin76 | Bin77 | Bin78 | Bin79 | Bin80 | Bin81 | Bin82 | Bin83 |
| 7 | Bin84 | Bin85 | Bin86 | Bin87 | Bin88 | Bin89 | Bin90 | Bin91 | Bin92 | Bin93 | Bin94 | Bin95 |
| 8 | Bin96 | Bin97 | Bin98 | Bin99 | Bin100 | Bin101 | Bin102 | Bin103 | Bin104 | Bin105 | Bin106 | Bin107 |
| 9 | Bin108 | Bin109 | Bin110 | Bin111 | Bin112 | Bin113 | Bin114 | Bin115 | Bin116 | Bin117 | Bin118 | Bin119 |
| 10 | Bin120 | Bin121 | Bin122 | Bin123 | Bin124 | Bin125 | Bin126 | Bin127 | Bin128 | Bin129 | Bin130 | Bin131 |
| 11 | Bin132 | Bin133 | Bin134 | Bin135 | Bin136 | Bin137 | Bin138 | Bin139 | Bin140 | Bin141 | Bin142 | Bin143 |
| 12 | Bin144 | Bin145 | Bin146 | Bin147 | Bin148 | Bin149 | Bin150 | Bin151 | Bin152 | Bin153 | Bin154 | Bin155 |
| 13 | Bin156 | Bin157 | Bin158 | Bin159 | Bin160 | Bin161 | Bin162 | Bin163 | Bin164 | Bin165 | Bin166 | Bin167 |
| 14 | Bin168 | Bin169 | Bin170 | Bin171 | Bin172 | Bin173 | Bin174 | Bin175 | Bin176 | Bin177 | Bin178 | Bin179 |

ND FLASH MEMORY DATA PROTECTION

DATA STORAGE DEVICE AND METHOD FOR DATA PROTECTION USING XOR PARITY

FIELD

This application relates generally to data storage devices, and more particularly, to data storage devices and methods for protecting host data in data storage devices from failures.

BACKGROUND

NAND flash memory is commonly used in everyday devices including smart telephones, computers, disk drives, and the like. Compared to other types of memory, NAND flashy memory is less expensive, smaller in size, has relatively low power consumption, and is easier to interface electronically.

SUMMARY

NAND flash memory are, however, susceptible to NAND failures, for example, program failures, silent read failures, and the like. These failures may result in data loss that may reduce the reliability of the data storage device. Accordingly, there is a need to protect host data from failures in the data storage device.

Various techniques are used to guard or protect against NAND failures or in the alternative detect NAND failures. In one example, XORs of word lines (WLs) is performed and stored either in the same memory block or in a separate memory block. The stored XORs may be used to recover lost data of the memory blocks. In another example, a shifted dual write scheme is used such that the same host data is written twice, for example, in separate memory block. However, both of the above-noted schemes generally require additional unusable memory space reducing the memory capacity of the data storage devices. Accordingly, there is a need for a data storage device and a corresponding method to reliably protect the host data in data storage device from failure that does not require high amounts of storage space.

One embodiment provides a data storage device including a non-volatile memory and a data storage controller coupled to the non-volatile memory. The data storage controller is configured to generate a first plurality of XOR parities based on first data of a first metablock of the non-volatile memory and store the first plurality of XOR parities in a second metablock of the non-volatile memory. The data storage controller is also configured to generate a second plurality of XOR parities based on second data of the second metablock. The second data includes two or more XOR parities of the first plurality of XOR parities. The data storage controller is further configured to store the second plurality of XOR parities in a reserved portion of the first metablock and detect a failure in the first metablock resulting in data loss. The data storage controller is also configured to recover lost data of the first metablock based on the second plurality of XOR parities.

Another embodiment provides a method for protecting data in a data storage device from failures. The method includes generating, using a data storage controller of the data storage device, a first plurality of XOR parities based on first data of a first metablock of a non-volatile memory of the data storage device and storing, using the data storage controller, the first plurality of XOR parities in a second metablock of the non-volatile memory. The method includes generating, using the data storage controller, a second plurality of XOR parities based on second data of the second metablock. The second data includes two or more XOR parities of the first plurality of XOR parities. The method also includes storing, using the data storage controller, the second plurality of XOR parities in a reserved portion of the first metablock and detecting, using the data storage controller, a failure in the first metablock resulting in data loss. The method further includes recovering, using the data storage controller, lost data of the first metablock based on the second plurality of XOR parities.

Another embodiment provides an apparatus including means for generating a first plurality of XOR parities based on first data of a first metablock of a non-volatile memory and means for storing the first plurality of XOR parities in a second metablock of the non-volatile memory. The apparatus also includes means for generating a second plurality of XOR parities based on second data of the second metablock. The second data includes two or more XOR parities of the first plurality of XOR parities. The apparatus further includes means for storing the second plurality of XOR parities in a reserved portion of the first metablock and means for detecting a failure in the first metablock resulting in data loss. The apparatus also includes means for recovering lost data of the first metablock based on the second plurality of XOR parities.

Various aspects of the present disclosure provide for data storage devices configured to perform various index searches based on a received pseudocode file and search key from a host device. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 2 is an illustration of a metablock of the data storage device of FIG. 1 in accordance with some embodiments.

FIG. 3 is an illustration of a metablock of the data storage device of FIG. 1 in accordance with some embodiments.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that the concepts discussed herein are applicable to any of solid-state memory, such as NOR, NAND, PCM ("Phase Change Memory"), ReRAM, MRAM, DRAM, etc.

Figure 1:
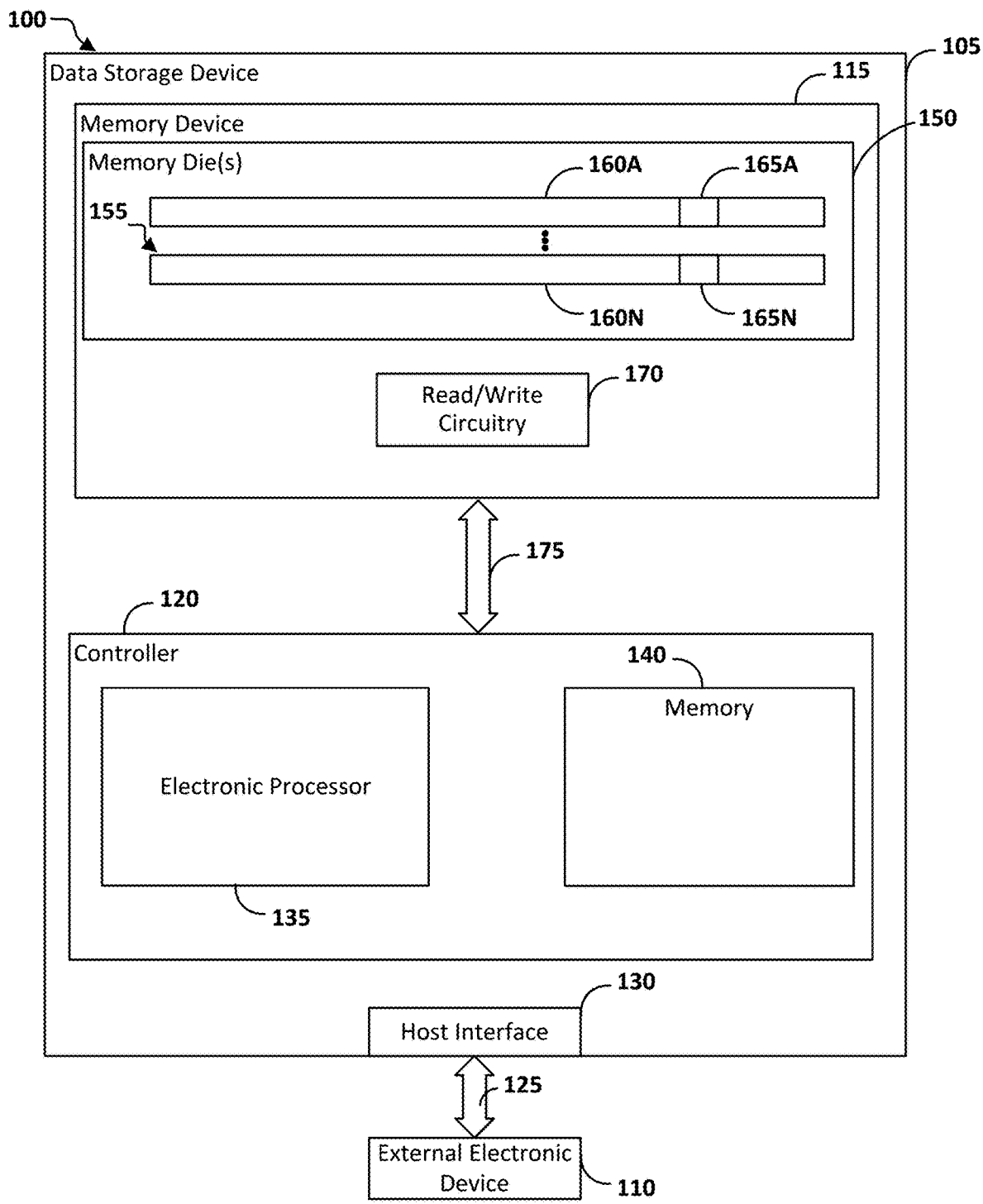
FIG. 1 is a block diagram illustrating one example of a system including a data storage device in accordance with some embodiments.

FIG. 1 is a block diagram of one example of a memory system 100 as used in an electronic device. In the example of FIG. 1, the system 100 includes a data storage device 105 in communication with one or more external electronic devices 110 (for example, host devices). The data storage device 105 includes one or more memory devices 115 (for example, a non-volatile memory 115) that are coupled to a controller 120 (for example, a data storage controller 120).

One example of the structural and functional features provided by the controller 120 are illustrated in FIG. 1. However, the controller 120 is not limited to the structural and functional features provided by the controller 120 in FIG. 1. The controller 120 may include fewer or additional structural and functional features that are not illustrated in FIG. 1.

The data storage device 105 and the one or more external electronic devices 110 may be operationally coupled through a connection (for example, a communication path 125), such as a bus or a wireless connection. In some examples, the data storage device 105 may be embedded within the external electronic device 110. Alternatively, in other examples, the data storage device 105 may be removable from the external electronic device 110 (i.e., "removably" coupled to the external electronic device 110). As an example, the data storage device 105 may be removably coupled to the external electronic device 110 in accordance with a removable universal serial bus (USB) configuration. In some implementations, the data storage device 105 may include or correspond to a solid state drive (SSD), which may be used as an embedded storage drive (for example, a mobile embedded storage drive), an enterprise storage drive (ESD), a client storage device, a cloud storage drive, or other suitable storage drives.

The data storage device 105 may be configured to be coupled to the external electronic device 110 using the communication path 125, such as a wired communication path and/or a wireless communication path. For example, the data storage device 105 may include an interface 130 (for example, a host interface 130) that enables communication using the communication path 125 between the data storage device 105 and the external electronic device 110, such as when the interface 130 is communicatively coupled to the external electronic device 110. In some examples, the external electronic device 110 may provide power to the data storage device 105. For example, the external electronic device 110 may provide one or more regulated voltages to the data storage device 105, such as 12 VDC, 5 VDC, 3.3 VDC, etc.

The external electronic device 110 may include a processor 135 and a memory 140. The memory 140 may be configured to store data and/or instructions that may be executable by the processor 135. The memory 140 may be a single memory or may include one or more memories, such as one or more non-volatile memories, one or more volatile memories, or a combination thereof. The external electronic device 110 may issue one or more commands to the data storage device 105, such as one or more requests to erase data at, read data from, or write data to the memory device 115 of the data storage device 105. For example, the external electronic device 110 may be configured to provide data, such as user data, to be stored at the memory device 115 or to request data to be read from the memory device 115. The external electronic device 110 may include a mobile smartphone, a music player, a video player, a gaming console, an electronic book reader, a personal digital assistant (PDA), a computer, such as a laptop computer or notebook computer, any combination thereof, or other suitable electronic device.

The external electronic device 110 communicates using a memory interface that enables reading from the memory device 115 and writing to the memory device 115. In some examples, the external electronic device 110 may operate in compliance with an industry specification, such as a Universal Flash Storage (UFS) Host Controller Interface specification. In other examples, the external electronic device 110 may operate in compliance with one or more other specifications, such as a Secure Digital (SD) Host Controller specification or other suitable industry specification. The external electronic device 110 may also communicate with the memory device 115 in accordance with any other suitable communication protocol.

The memory devices 115 of the data storage device 105 may include a non-volatile memory (for example, NAND, NOR, BiCS family of memories, or other suitable memory). In some examples, the memory device 115 may be any type of flash memory. For example, the memory device 115 may be two-dimensional (2D) memory or three-dimensional (3D) flash memory. The memory device 115 may include one or more memory dies 150. In some of the embodiments, individual memory dies 150 or groups of memory dies 150 may be referred to as arrays. Each of the one or more memory dies 150 may include one or more memory blocks 155 (for example, one or more erase blocks, a plurality of memory blocks). The one or more memory blocks 155 may arranged in one or more planes. Each memory block 155 may include one or more groups of storage elements, such as a representative group of storage elements 160A-160N. The group of storage elements 160A-160N may be configured as a word line or a page. The group of storage elements 160A-160N may include multiple storage elements (for example, memory cells that are referred to herein as a "string"), such as a representative storage elements 165A and 165N, respectively. Data from the host may be written to one or more metablocks. A metablock may be selected from a plurality of memory blocks 155 spanning across multiple planes. The pages of the plurality of memory blocks 155 may be grouped together and referred to as a metapage.

The memory device 115 may include support circuitry, such as read/write circuitry 170. Although depicted as a single component, the read/write circuitry 170 may be divided into separate components of the memory device 115, such as read circuitry and write circuitry. The read/write circuitry 170 may be external to the one or more memory dies 150 of the memory device 115. Alternatively, one or more individual memory dies 150 may include corresponding read/write circuitry 170 that is operable to read from and/or write to storage elements within the individual memory die 150, independent of any other read and/or write operations at any of the other memory dies 150. For example, the read/write circuitry 170 may be configured to perform various read/write operations such as initial writing to volatile memory, array commit functions, and other functions as required for a given application.

The controller 120 is coupled to the memory device 115 (for example, the one or more memory dies 150) using a bus 175, an interface (for example, interface circuitry), another structure, or a combination thereof. For example, the bus 175 may include multiple distinct channels to enable the controller 120 to communicate with each of the one or more memory dies 150 and/or memory devices 115 in parallel with, and independently of, communication with the other memory dies 150 and/or memory devices 115.

The controller 120 is configured to receive data and instructions from the external electronic device 110 and to send data to the external electronic device 110. For example, the controller 120 may send data to the external electronic device 110 using the interface 130, and the controller 120 may receive data from the external electronic device 110 using the interface 130. The controller 120 is configured to send data and commands to the memory device 115 and to receive data from the memory device 115. For example, the controller 120 is configured to send data and a program or write command to cause the memory device 115 to store data to a specified address of the memory device 115. The write command may specify a physical address of a portion of the memory device 115 (for example, a physical address of a word line of the memory device 115) that is to store the data, as well as a size (for example, 2 k, 4 k, etc.) of the data to be written.

The controller 120 is further configured to send a read command to the memory device 115 to access data from a specified address of the memory device 115. The read command may specify the physical address of a region of the memory device 115 (for example, a physical address of a word line of the memory device 115), as well as a size (for example, 2 k, 4 k, etc.) of the data to be read. As will be described in more detail below, the controller 120 may further be configured to process received read commands by executing one or more indexing functions in response to one or more search or index keys received from the external electronic devices 110.

The controller 120 may also be configured to send data and commands to the memory device 115 associated with background scanning operations, garbage collection operations, and/or wear-leveling operations, or other suitable memory operations.

Figure 2:
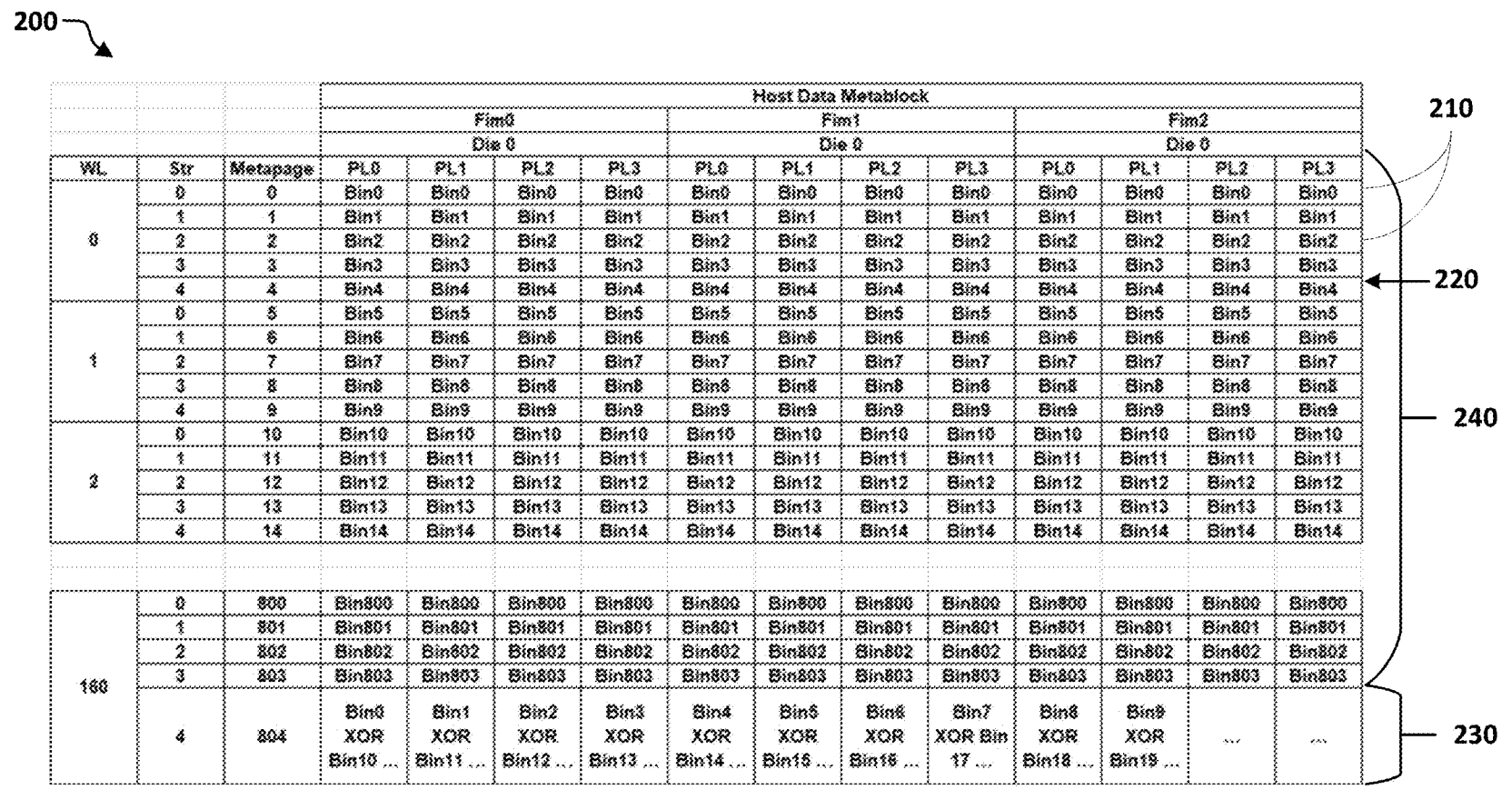

FIG. 2 illustrates an example metablock 200 (for example, a first metablock 200) of the memory device 115. In the example illustrated, the first metablock 200 is a host data metablock that is used for storing host data (or referred to as external electronic device data) received from the external electronic device 110. The basic building block of the memory device 115 is a memory cell 210, which may be a single level cell storing a single bit (for example, 0 or 1) or a multi-level cell (for example, a triple level cell or quad level cell) storing more than a single bit. The memory cells 210 are arranged in rows and columns (for illustration purposes) in the first metablock 200. All the memory cells 210 within a row of the first metablock 200 may share a word line address (for example, WL0, WL1, and so on) and a string address (for example, STR0, STR1, and so on) or a metapage address (for example metapage 0, metapage 1, and so on). All the memory cells 210 within a column of the first metablock 200 may share a plane (for example PL0, PL1, PL2, PL3) and a memory block 155 (for example, Fim0, Fim1, and so on).

As illustrated in the example of FIG. 2, memory cells 210 across a single row (for example, a single string or a single metapage) are binned together to create a bin 220 (for example, first data). The memory cells 210 across a single row (that is, a bin 220) are also XORed to determine an XOR parity of the row. For ease of understanding, memory cells 210 that are binned together are provided a bin label in FIG. 2. For example, memory cells 210 in the first row are labeled Bin0, memory cells 210 in the second row are labeled Bin1, and so on. The XOR of each bin 220 is stored in a separate metablock (for example, an XOR parity metablock). FIG. 2 illustrates only one example of the first pre-defined set of data. The binning may be performed using a different structure, for example, all memory cells 210 of a word line within a single plane may be binned together. The combination of memory cells 210 for the first pre-defined set of data may be varied based on the requirements of the data storage device 105.

FIG. 3 illustrates an example parity metablock 300 (for example, a second metablock 300). In the example illustrated, the second metablock 300 is an XOR parity metablock that is used for temporarily storing XOR parity data of the first metablock 200. In some embodiments, the second metablock 300 is part of the same memory device 115 as the first metablock 200. In other embodiments, the second metablock 300 is part of the memory 140 of the controller 120. As shown in FIG. 3, each memory cell 310 of the second metablock 300 stores XOR parity data of a single bin 220 of the first metablock 200. The XOR parity data stored in the second metablock 300 may be used to protect against program failures of the host data. Specifically, the controller 120 detects program failures of the first metablock 200 and uses the XOR parities in the second metablock 300 to recover any lost data.

Returning to FIG. 2, a portion (for example, reserved portion 230) of the first metablock 200 may be reserved for XOR of XOR parities. The non-reserved portion 240 of the first metablock 200 may be referred to as the host data portion 240. Host data from the external electronic device 110 can be written and read from the host data portion 240. However, the host data is prevented from being written to the reserved portion 230. This restriction may be enforced by the controller 120. The controller 120 stores the XOR of XOR parities in the reserved portion 230. The XOR of XOR parities may be performed on any pre-defined set of data (for example, second data). In the example illustrated in FIGS. 2 and 3, the XOR of XOR parities is performed on a set of plurality of memory cells 310 separated by a predetermined number of memory cells 310. In one example, the second pre-defined set of data includes memory cells separated by ten (10) memory cells, for example, Bin0, Bin10, Bin20, and so on. However, it should be noted that any combination of memory cells 310 including any different number of memory cells 310 may be used to perform the XOR of XOR parities. When the XOR of XOR parities is stored in the first metablock 200, the second metablock 300 may be erased releasing the second metablock 300 for data storage. For example, the second metablock 300 can then be used as a host data metablock or as an XOR parity metablock for a different host data metablock. The controller 120 may write additional host data to the second metablock 300. The XOR of XOR parities may be used to protect silent read failures. For example, when the host data is read from the first metablock 200, the controller 120 may detect a silent read failure resulting in data loss. The data may be recovered using the XOR of XOR parities stored in the reserved portion 230 of the first metablock 200.

Figure 4:
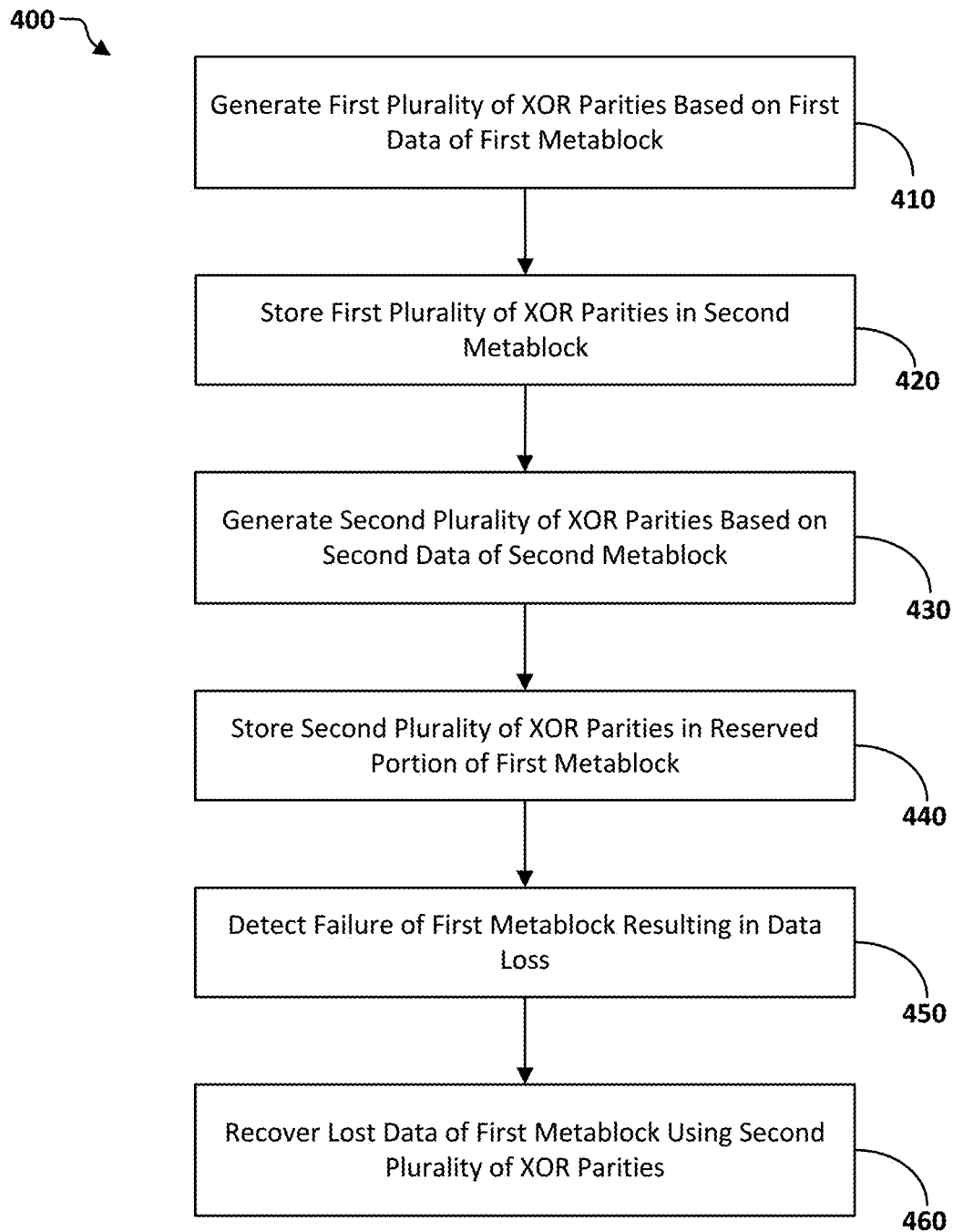
FIG. 4 is a flow chart of an example method for protecting external electronic device data in the data storage device of FIG. 1 from failures in accordance with some embodiments.

FIG. 4 illustrates a flowchart of one example method 400 for protecting data in the data storage device 105 from failures. In the example illustrated, the method 400 includes generating, using the controller 120, a first plurality of XOR parities based on first data of the first metablock 200 (at block 410). As discussed above, the controller 120 may bin together a row or metapage of memory cells 210, the data stored in which forms, for example, a subset of first data. The controller 120 generates an XOR of each bin 220 (that is, a first plurality of XOR parities corresponding to first data). The method 400 also includes storing, using the controller 120, the first plurality of XOR parities in a second metablock 300 (at block 420). The controller 120 stores each of the XOR parities in a separate memory cell 310 of the second metablock 300. The first plurality of XOR parities may be used to recover data when the first metablock 200 is open. A metablock is considered open when the metablock is currently being used for writing data. An open metablock may experience a program failure or enhanced post write read (EPWR) failure. The first plurality of XOR parities may be used to recover data lost due after a program failure or EPWR failure.

The method 400 further includes generating, using the controller 120, a second plurality of XOR parities based on second data of the second metablock 300 (at block 430). The second data includes two or more XOR parities of the first plurality of XOR parities. In the example of FIGS. 2 and 3, the controller 120 generates XORs of data stored in a plurality of memory cells 310 separated by ten cells. That is, an XOR parity of two or more XOR parities of the first plurality of XOR parities is generated. The two or more XOR parities include, for example, Bin0, Bin10, Bin20, and so on. In other examples, the controller 120 may generate XORs of a different selection and combination of memory cells 310. The method 400 also includes storing, using the controller 120, the second plurality of XOR parities in the reserved portion 230 of the first metablock 200 (at block 440). The controller 120 stores each of the XOR of XOR parities in a separate memory cell 210 of the reserved portion 230 of the first metablock 200.

The method 400 further includes detecting, using the controller 120, a failure in the first metablock 200 resulting in data loss (at block 450). The failure may include, for example, a program failure, a silent read failure, or the like. Failures of the first metablock 200 may be detected in several ways. For example, a program failure may be detected based on NAND status commands from the memory device 115 informing about the program failures. Alternatively, for example, a program failure may be detected by programming data, ignoring NAND status and reading the data back, and decoding the data to determine whether the data passes. The method 400 also includes recovering, using the controller 120, lost data of the first metablock based on the second plurality of XOR parities (at block 460). The second plurality of XOR parities are used to recover data in a closed metablock. A metablock is when data is already written to the metablock and the metablock is not currently being programmed. In one example, the controller 120 detects that a silent read failure has occurred resulting in a data loss of the first metapage of the first metablock 200. The controller 120 uses the second plurality of XOR parities (for example, bin0 XOR bin10 XOR . . . ) to recover the first metapage of the first metablock 200. In one example, the controller detects that a program failure has occurred resulting in a data loss of the first metapage of the first metablock 200. The controller 120 uses the first plurality of XOR parities (for example, bin0) to recover the first metapage of the first metablock 200 and reprogram the first metablock 200 based on the recovered data. In some embodiments, the controller 120 may also use the second plurality of XOR parities to recover after detecting program failures.

In the example of FIGS. 2 and 3, the storage requirement of XOR parities is significantly reduced because an additional XOR operation is performed on the first plurality of XOR parities. However, the ability of the data storage device 105 is unaffected as any data loss is still capable of being recovered. Additional storage savings can be obtained by using a different second pre-defined set of data.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
a non-volatile memory; and
a data storage controller coupled to the non-volatile memory and configured to:
generate a first plurality of XOR parities based on first data of a first metablock of the non-volatile memory;
store the first plurality of XOR parities in a second metablock of the non-volatile memory;
generate a second plurality of XOR parities based on second data of the second metablock, wherein the second data includes two or more XOR parities of the first plurality of XOR parities;
store the second plurality of XOR parities in a reserved portion of the first metablock;
detect a failure in the first metablock resulting in data loss; and recover lost data of the first metablock using the second plurality of XOR parities.

2. The data storage device of claim 1, wherein the first data is stored in a metapage of the first metablock.

3. The data storage device of claim 1, wherein the second data is stored in a plurality of memory cells of the second metablock separated by a predetermined number of memory cells.

4. The data storage device of claim 1, wherein the data storage controller is further configured to write data from a host device to the first metablock excluding the reserved portion of the first metablock.

5. The data storage device of claim 4, wherein the data storage controller is further configured to:
erase the first plurality of XOR parities from the second metablock after the second plurality of XOR parities are stored in the first metablock; and
write additional host data to the second metablock.

6. The data storage device of claim 1, wherein, to detect the failure in the first metablock resulting in the data loss, the data storage controller is configured to detect a program failure of the first metablock, and
recover the lost data of the first metablock using the first plurality of XOR parities.

7. The data storage device of claim 1, wherein, to detect the failure in the first metablock resulting in the data loss, the data storage controller is configured to detect a silent read failure of the first metablock.

8. A method for protecting data in a data storage device from failures, the method comprising:
generating, using a data storage controller of the data storage device, a first plurality of XOR parities based on first data of a first metablock of a non-volatile memory of the data storage device;
storing, using the data storage controller, the first plurality of XOR parities in a second metablock of the non-volatile memory;
generating, using the data storage controller, a second plurality of XOR parities based on second data of the second metablock, wherein the second data includes two or more XOR parities of the first plurality of XOR parities;
storing, using the data storage controller, the second plurality of XOR parities in a reserved portion of the first metablock;
detecting, using the data storage controller, a failure in the first metablock resulting in data loss; and
recovering, using the data storage controller, lost data of the first metablock using the second plurality of XOR parities.

9. The method of claim 8, wherein the first data is stored in a metapage of the first metablock.

10. The method of claim 8, wherein the second data is stored in a plurality of memory cells of the second metablock separated by a predetermined number of memory cells.

11. The method of claim 8, further comprising writing data from a host device to the first metablock excluding the reserved portion of the first metablock.

12. The method of claim 11, further comprising:
erasing the first plurality of XOR parities from the second metablock after the second plurality of XOR parities are stored in the first metablock; and
writing additional host data to the second metablock.

13. The method of claim 8, wherein detecting the failure in the first metablock resulting in the data loss further includes detecting a program failure of the first metablock, the method further comprising:
recovering the lost data of the first metablock using the first plurality of XOR parities.

14. The method of claim 8, wherein detecting the failure in the first metablock resulting in the data loss further includes detecting a silent read failure of the first metablock.

15. An apparatus comprising:
means for generating a first plurality of XOR parities based on first data of a first metablock of a non-volatile memory;
means for storing the first plurality of XOR parities in a second metablock of the non-volatile memory;
means for generating a second plurality of XOR parities based on second data of the second metablock, wherein the second data includes two or more XOR parities of the first plurality of XOR parities;
means for storing the second plurality of XOR parities in a reserved portion of the first metablock; and
means for detecting a failure in the first metablock resulting in data loss; and
means for recovering lost data of the first metablock using the second plurality of XOR parities.

16. The apparatus of claim 15, wherein the first data is stored in a metapage of the first metablock, and wherein the second data is stored in a plurality of memory cells of the second metablock separated by a predetermined number of memory cells.

17. The apparatus of claim 15, further comprising means for writing data from a host device to the first metablock excluding the reserved portion of the first metablock.

18. The apparatus of claim 17, further comprising:
means for erasing the first plurality of XOR parities from the second metablock after the second plurality of XOR parities are stored in the first metablock; and
means for writing additional host data to the second metablock.

19. The apparatus of claim 15, wherein means for detecting the failure in the first metablock resulting in the data loss further includes means for detecting a program failure of the first metablock, and wherein the apparatus further comprising:
means for recovering the lost data of the first metablock using the first plurality of XOR parities.

20. The apparatus of claim 15, wherein means for detecting the failure in the first metablock resulting in the data loss further includes means for detecting a silent read failure of the first metablock.

* * * * *